United States Patent
Freilich

(10) Patent No.: US 7,400,876 B2
(45) Date of Patent: Jul. 15, 2008

(54) METHOD AND SYSTEM FOR PROVIDING TELEMATICS UNIT INFORMATION

(75) Inventor: Robert W. Freilich, Oak Park, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/194,297

(22) Filed: Aug. 1, 2005

(65) Prior Publication Data

US 2007/0026876 A1    Feb. 1, 2007

(51) Int. Cl.
*H04M 11/04* (2006.01)
*H04Q 7/20* (2006.01)

(52) U.S. Cl. .............. 455/404.1; 455/404.2; 455/456.1; 455/456.2; 455/456.3; 379/37; 379/45

(58) Field of Classification Search .............. 455/404.1, 455/404.2, 461, 521, 456.1, 456.2, 456.3; 379/37, 45
See application file for complete search history.

(56) References Cited

U.S. PATENT DOCUMENTS

| | | | |
|---|---|---|---|
| 7,123,926 B2 * | 10/2006 | Himmelstein | 455/456.1 |
| 2003/0073440 A1 * | 4/2003 | Mukherjee et al. | 455/435 |
| 2004/0142678 A1 * | 7/2004 | Krasner | 455/404.2 |
| 2005/0070315 A1 * | 3/2005 | Rai et al. | 455/466 |
| 2005/0201359 A1 * | 9/2005 | Nelson et al. | 370/352 |
| 2005/0282518 A1 * | 12/2005 | D'Evelyn et al. | 455/404.1 |
| 2006/0068753 A1 * | 3/2006 | Karpen et al. | 455/404.2 |
| 2006/0098803 A1 * | 5/2006 | Bushey et al. | 379/266.02 |
| 2006/0128357 A1 * | 6/2006 | Suryanarayana et al. | 455/404.2 |
| 2006/0227959 A1 * | 10/2006 | Mitchell | 379/221.13 |
| 2006/0293024 A1 * | 12/2006 | Benco et al. | 455/404.2 |
| 2006/0293813 A1 * | 12/2006 | Nou | 701/33 |
| 2007/0066277 A1 * | 3/2007 | Bharatia et al. | 455/404.2 |

* cited by examiner

*Primary Examiner*—Barry W Taylor

(57) ABSTRACT

A method for providing telematics unit information includes generating an awareness message at a telematics unit, the awareness message including a subscriber status wherein the subscriber status includes location and state information, assigning a current value to the subscriber status, and sending the awareness message with the current value from the telematics unit to a telematics call center. A computer usable medium with suitable computer program code is employed for providing telematics unit information.

21 Claims, 3 Drawing Sheets

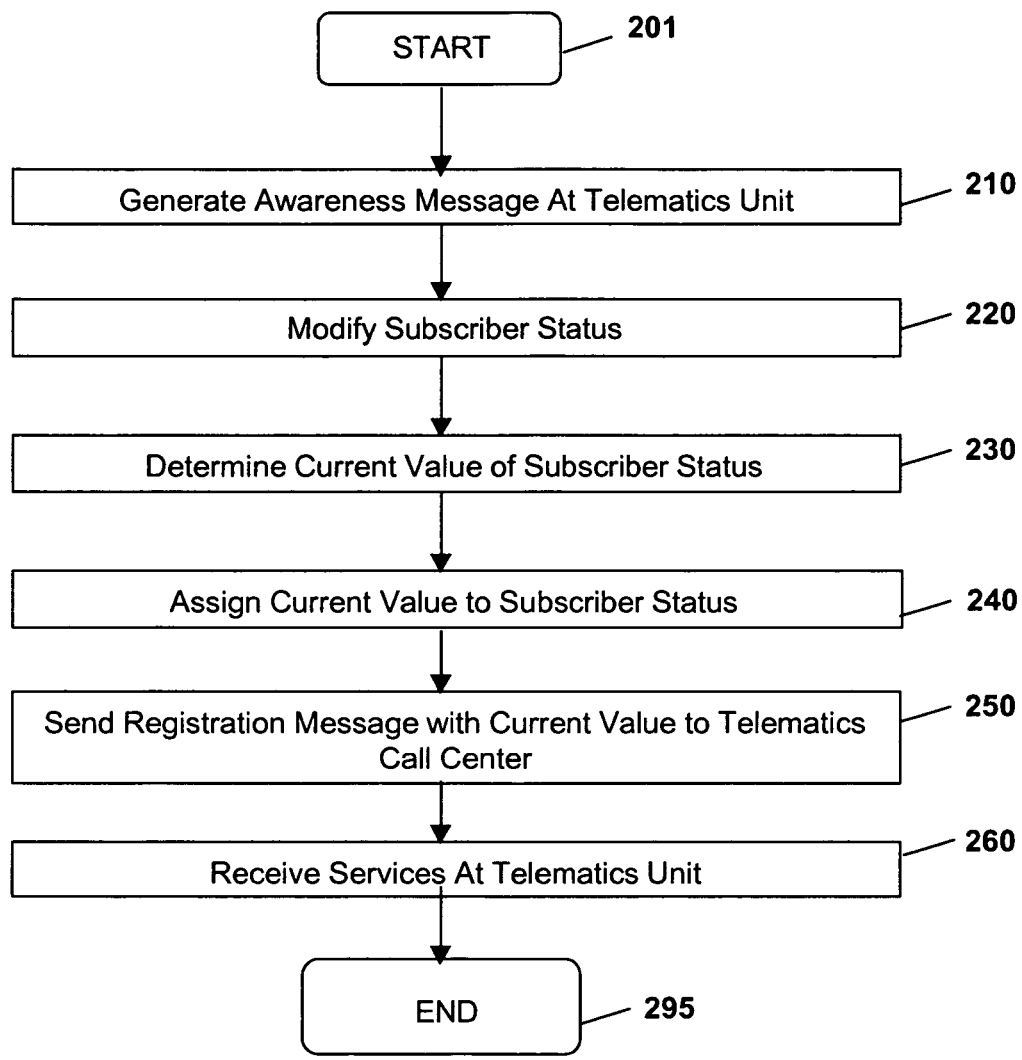

REGISTER sip:service.company.com;
316 → user=*STID*51693597*MODE*On*H*273a0e603ff382cade82ee253fa9
cb25da429b9162a999af8ffba51a3bc01bd2872fa1c9825faec39e*
318 → SIP/2.0
v: SIP/2.0/TCP 111.111.222.222:5060
f: <sip:51693597@company.com>
t: <sip:51693597@service.company.com>
i: 1000@company.com
CSeq: 1 REGISTER
Expires: 28800
Authorization: Digest realm="service.company.com", qop="auth",
nonce="ea9c8e88df84f1cec4341ae6cbe5a359",
opaque="",uri="service.company.com", username="STID(51693597)",
response="dfe56131d1958046689d83306477ecc"
m: <sip:111.111.222.222:5060>
l: 0

FIG. 4

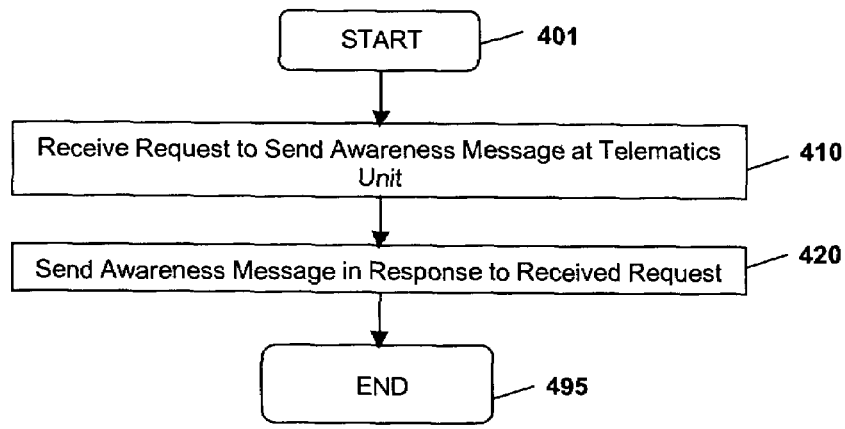

METHOD AND SYSTEM FOR PROVIDING TELEMATICS UNIT INFORMATION

FIELD OF THE INVENTION

This invention relates generally to telematics systems. In particular the invention relates to a method and system for providing telematics unit information.

BACKGROUND OF THE INVENTION

Telematics units enable a service provider to remotely connect to the telematics unit without a service subscriber being in the vehicle in order to provide services, such as a door unlock service. To determine the telematics unit identification number, the state of the telematics unit and the location of the vehicle, service providers rely on verbal information provided by a subscriber, such as that they are not in the vehicle and the keys are locked inside.

To conserve battery power a sleep cycle is used where the telematics unit cycles between a powered on and powered off state for a period of time. The service provider does not have the ability to determine the current state of the telematics unit, without issuing a request and waiting for a response. If a service is requested by a subscriber, the service provider transmits the service to the telematics unit and waits for the telematics unit to acknowledge the service. For example, if a door unlock service is requested, the service provider does not know whether the telematics unit is on or off and therefore cannot supply the subscriber with an exact time that the door will unlock.

In addition, location information is not readily discernable by the service provider thereby limiting the ability of the service provider to supply location based services. Location based services include weather alerts, traffic reports and vehicle tracking.

Various protocols can be used for communication between the service provider and the telematics unit. One such protocol is the session initiation protocol (SIP). SIP is a text-based peer-to-peer protocol that facilitates the formation, modification, and execution of communication sessions between two or more participants also referred to as user agents. The user agent can be a personal computer, landline Internet-protocol telephony telephone system, an automation component such as a voicemail server, or a communication device such as a telematics unit. Interactions include peer-to-peer and multi-point communications.

Each user agent is identified by an address, referred to as the SIP uniform resource indicator or SIP URI that simulates an email address and is used for identification and location purposes. The SIP URI contains a userinfo field and a domain field. A user parameter is used to identify the userinfo field as a phone number or an IP address. This SIP URI specifies the user agent's address and location on the network but does not provide information relating to the geographic location of the SIP user agent, nor does it provide information relating to the availability of the user agent as indicated by the operational status of the SIP user agent. Without this information, the level of service that can be supplied by the service provider is limited.

A session initiation protocol (SIP) network is composed of five types of logical SIP entities including a user agent, a proxy server, a redirect server, a registrar server, a back-to-back user agent. Each entity has specific functions and participates in SIP communication as a client (initiates requests), as a server (responds to requests), or as both. The SIP specification is provided by the Internet Engineering Task Force (IETF) in RFC 3261 which is herein incorporated by reference in its entirety.

SIP has a limited library of requests. The library includes INVITE, REGISTER, BYE, INFO, OPTIONS, and MESSAGE.

It is therefore desirable to provide a method and system for providing telematics unit information that overcomes the limitations, challenges, and obstacles described above.

SUMMARY OF THE INVENTION

One aspect of the present invention provides a method for providing telematics unit information comprising generating an awareness message at a telematics unit, the awareness message including a subscriber status wherein the subscriber status includes location and state information, assigning a current value to the subscriber status, and sending the awareness message with the current value from the telematics unit to a telematics call center.

Another aspect of the present invention provides a system for providing telematics unit information comprising means for generating an awareness message at a telematics unit, the awareness message including a subscriber status wherein the subscriber status includes location and state information, means for assigning a current value to the subscriber status, and means for sending the awareness message with the current value from the telematics unit to a telematics call center.

A third aspect of the present invention provides a computer readable medium storing a computer program including computer program code for providing telematics unit information comprising computer program code for generating an awareness message at a telematics unit, the awareness message including a subscriber status wherein the subscriber status includes location and state information, computer program code for assigning a current value to the subscriber status, and computer program code for sending the awareness message with the current value from the telematics unit to a telematics call center.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF DRAWINGS

FIG. 2 illustrates a flowchart representative of one embodiment of a method for providing telematics unit information, in accordance with the present invention;

FIG. 3 illustrates an exemplary SIP REGISTER request message; and

FIG. 4 illustrates a flowchart representative of one embodiment of the step of sending the awareness message with the current value from the telematics unit to the telematics call center, in accordance with the present invention.

DETAILED DESCRIPTION OF THE PRESENTLY PREFERRED EMBODIMENTS

Figure 1:
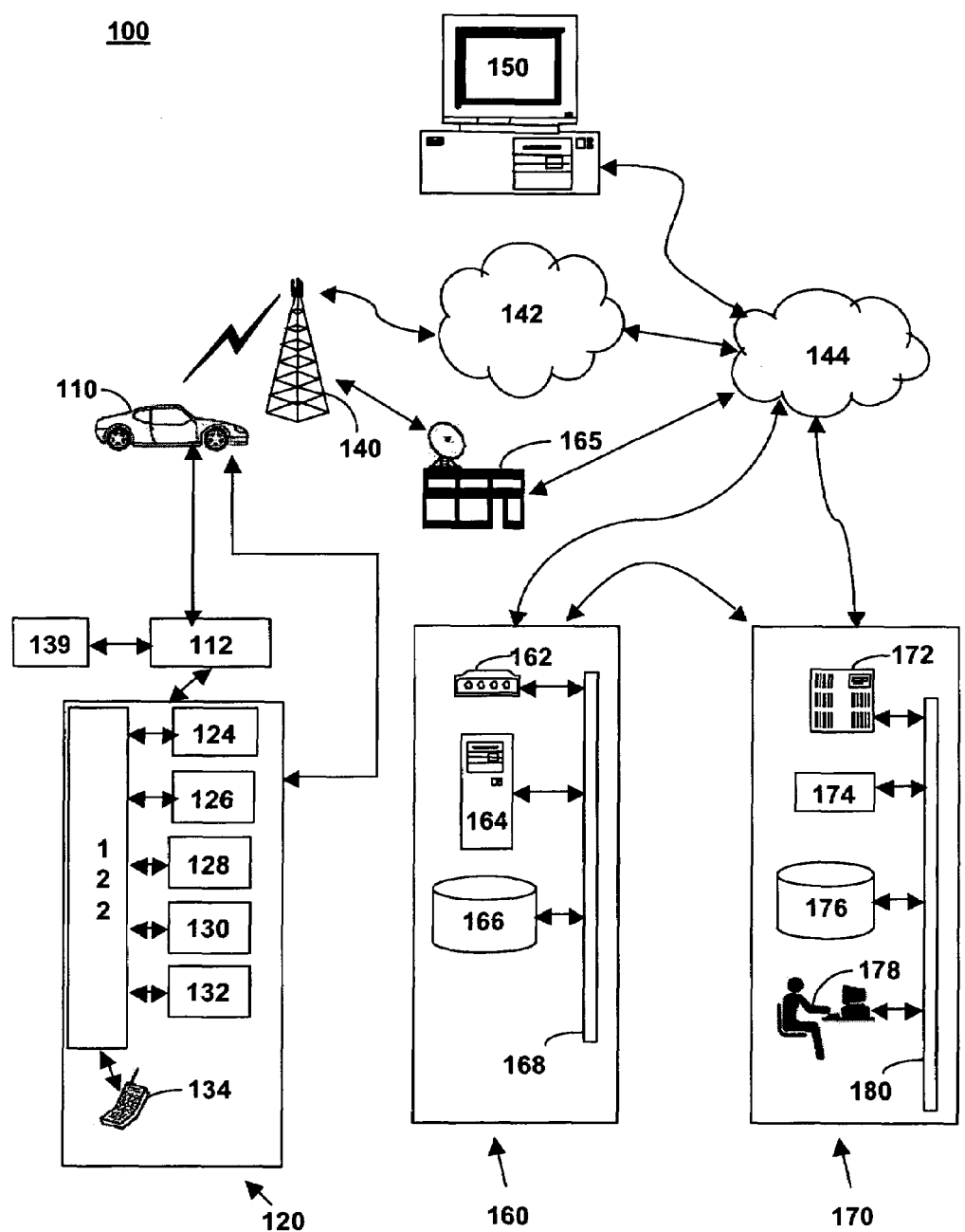
FIG. 1 illustrates one embodiment of a system for providing telematics unit information, in accordance with the present invention.

FIG. 1 illustrates one embodiment of a system for providing telematics unit information, in accordance with the present invention at 100. The telematics unit information system includes a mobile vehicle communication unit (MVCU) 110, a vehicle communication network 112, one or more embedded modules 139, a communication device such as a telematics unit 120, one or more wireless carrier systems 140, one or more communication networks 142, one or more land networks 144, one or more client, personal, or user computers 150, one or more web-hosting portals 160, and one or more call centers 170. In one embodiment, MVCU 110 is implemented as a mobile receiving voice and data communications. In one embodiment, a display such as a dialed digital display in a radio unit or in an instrument panel is embedded in MVCU 110. In other embodiments, MVCS 100 includes additional components not relevant to the present discussion. Mobile vehicle communication systems and telematics units are known in the art.

Embedded modules 139 are any electronic module configured to enable or assist in the operation of MVCU 110, or any of its included systems. For example, one embedded module performs odometer functions, while another embedded module controls HVAC operations within the vehicle. Any number of embedded modules 139 can be included.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

MVCU 110, via telematics unit 120, sends and receives radio transmissions from wireless carrier system 140. Wireless carrier system 140 is implemented as any suitable system for transmitting a signal from MVCU 110 to communication network 142.

In one embodiment, telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 is implemented without one or more of the above listed components such as, for example, GPS unit 126 or speakers 132 or includes additional components not relevant to the present discussion.

In various embodiments, processor 122 is implemented as a digital signal processor (DSP), microcontroller, microprocessor, controller, host processor, or vehicle communications processor. In an example, processor 122 is implemented as an application-specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, satellite uplink facility 165, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, satellite uplink facility 165, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. In one embodiment, modem 162 resides inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. In one embodiment, web server 164 includes computer applications and files for managing and storing personalization settings supplied by the client and subscriber status supplied by telematics unit 120. For each subscriber, the web server potentially stores hundreds of preferences for wireless vehicle communication, networking, maintenance and diagnostic services for a mobile vehicle.

In one embodiment, one or more web servers 164 are networked via network system 168 to distribute data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a test center facilitating communications to mobile vehicle 110 for testing of embedded modules 139. In another embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or in different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives requests for a variety of services from the client via computer 150, web-hosting portal 160, and land network 144 and awareness messages from telematics unit 120. Communication services manager 174 transmits requests for subscriber status and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 can provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144 and web hosting portals 160 using voice or data transmissions. In an alternative embodiment, communication services manager 174 communicates with telematics unit 120 in MVCU 110 through wireless carrier system 140, communication network 142, land network 144, and web hosting portals 160 using voice or data transmissions. Switch 172 selects between voice transmissions and data transmissions.

In one embodiment, SIP servers are implemented on communications services manager 174, web hosting portal 164, or other computer system (not shown). One physical device can have the functionality of more than one logical SIP entity. For example, communications services manager 174 working as a proxy server can also function as a registrar server at the same time. In another example, communications services manager 174 encompasses a proxy server, a redirect server, and a registrar server.

In one embodiment, telematics unit 120 determines a subscriber status and sends the subscriber status to communications services manager 174 or web hosting portal 164 using a SIP REGISTER request. The REGISTER message informs the communications services manager 174 or web hosting portal 164 of the SIP URI that identifies the telematics unit to the SIP network. Telematics unit 120 modifies the REGISTER request to include location and operational status information in the request header. In another embodiment, the SIP INVITE request is used. In yet another embodiment, the SIP BYE, SIP INFO, SIP OPTIONS, or SIP MESSAGE requests can be used.

Communications services advisor 178 accesses subscriber status that is received at communications services manager 174 or web hosting portal 164, and stored in database 166 or communication services database 176 when providing services to telematics unit 120.

FIG. 2 illustrates a flowchart 200 representative of one embodiment of a method for providing telematics unit information, in accordance with the present invention. The method begins at 201.

During step 210, an awareness message including a subscriber status is generated at telematics unit 120. The awareness message includes a subscriber status containing location and state information for the telematics unit. In one embodiment, the awareness message includes additional information relating to the telematics unit. In one embodiment, the awareness message is a SIP REGISTER request. Telematics unit 120 uses REGISTER requests to dynamically register its current location and state, which enables telematics unit 120 to be contacted when mobile. The state of the telematics unit is its present operational status. The subscriber status corresponds to the value of the user parameter in the SIP REGISTER request. In other embodiments, other SIP requests, including the SIP INVITE, SIP BYE, SIP INFO, SIP OPTIONS, or SIP MESSAGE requests can be used.

During step 220, the subscriber status is modified to include a plurality of data elements including an identification field, a mode field, and a location field. In one embodiment, the SIP user parameter field is modified to include three data elements which taken together provide the current location and operational status for a specific telematics unit. Each data element includes a field value that comprises the information being reported. The three data elements are identified as follows:

A. STID: represents the identification field and identifies the particular telematics unit for which the current geographic location and operational status apply. The associated field value is a telematics unit identification number determined from the identification number assigned to and stored in the telematics unit.

B. MODE: represents the mode field and is determined from the current operational status of the telematics unit at the time the register message is generated. The valid field values currently defined for the mode field of the awareness message are as follows:

"on"
"standby"
"sleep"
"off"
in-session
out of session

C. LOCATION INFORMATION: represents the location field and the associated field value is one large encrypted block utilizing the advanced encryption standard (AES), in one embodiment, to block encrypt the location information from the vehicle and embed the initialization vector (IV). In other embodiments, the location field can be encrypted with any other encryption standard, such as RSA, PGP, or public-key or private-key encryption standards. In other embodiments, the location field is not encrypted. The IV is required for proper decryption of the location information. The pre-encrypted location information includes the following data points determined from GPS location data provided by GPS unit 126:

Latitude
Longitude
Aged
Speed
Direction

During step 230, a current value of the subscriber status is determined. In one embodiment, the current value is determined by combining the telematics unit identification number, the operational status of the telematics unit and the present location of the telematics unit. During step 240, a current value is assigned to the subscriber status.

In one embodiment, the current value of the subscriber status is represented by the data following the user parameter and contains the three data elements previously defined. Those data elements include the identification field comprising the text string *STID* followed by a telematics unit identification number, the mode field comprising the text string *MODE* followed by the field value indicating the current operational status of the telematics unit, and the location field comprising the text string *H* followed by the field value including the encrypted location information.

The "*" characters included in the text strings associated with the three data elements are used as field separators to delimit the field values of the data elements. These field separators are provided so that a parser, located on the register server, can strip out the field values from the current value of the subscriber status.

During step 250, the awareness message with the current value is sent from the telematics unit 120 to the telematics call center. In one embodiment, the awareness message is sent upon the occurrence of a trigger event, such as a change in the operational status of the telematics unit. In another embodiment, the awareness message is sent at a predefined time interval. In another embodiment, the awareness message is sent in response to a request by the telematics call center. The telematics call center is either call center 170 or web hosting portal 160.

A SIP register server receives the awareness message and a parser determines the field values embedded in the subscriber status. The parsed field values are stored in a location database indexed to the STID. The communications services advisor 172 can access the information in this database to ascertain the current operational status and geographic location of a particular telematics unit requesting a service.

During step 260, services are received at the telematics unit based on the subscriber status. In one embodiment, the information derived from the subscriber status allows the services advisor to identify the telematics unit that issued the awareness message, precisely determine and deliver services to the telematics unit subscriber based on knowledge of the current operational status of the telematics unit, and provide location based services, such as traffic updates, weather alerts and vehicle tracking. During step 295, the method terminates.

FIG. 3 illustrates an exemplary SIP REGISTER request message. The request header string encompasses the first four lines in the shown in FIG. 3 and includes a message type 310, a method token 312, a register-URI 314 that includes the user parameter 316, and a protocol version 318. The user parameter 316 includes the *STID*, *MODE*, and *H* text strings and examples of their assigned values. The remaining lines are additional header fields required to complete the SIP REGISTER request. Those of skill in the art will readily recognize how to modify the request to apply to any of the SIP INVITE, SIP BYE, SIP INFO, SIP OPTIONS, or SIP MESSAGE requests.

FIG. 4 illustrates a flowchart 400 representative of one embodiment of the step of sending the awareness message with the current value from the telematics unit to the telematics call center, in accordance with the present invention. The method begins at 401.

During step 410, the telematics unit receives a request from the telematics call center to send the awareness message. A communications services advisor will send the request when an update of the subscriber status is desired. For example, the information in the call center database may not be current if a REGISTER request has not been recently sent by the telematics unit. The communications services advisor requests the awareness message to update the subscriber status in the call center database.

During step 420, the telematics unit sends the awareness message in response to the request. The awareness message includes the current subscriber status used to update the call center database.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for providing telematics unit information, the method comprising:
   generating an awareness message at a telematics unit, the awareness message including a session initiation protocol (SIP) request containing a subscriber status located in a header portion of the SIP request, wherein the subscriber status includes the operational status of the telematics unit; and
   sending the awareness message with the SIP request from the telematics unit to a call center.

2. The method of claim 1 further comprising:
   modifying the subscriber status to include a plurality of data elements wherein the plurality of data elements include an identification field, a mode field, and a location field.

3. The method of claim 2 wherein each of the plurality of data elements includes a field identifier and a corresponding field value wherein the field identifier and the corresponding field value are delimited by a field separator.

4. The method of claim 2 wherein the field value associated with the mode field of the subscriber status identifies the operational status of the telematics unit and is selected from the group consisting of on, standby, sleep, in-session, out of session, and off.

5. The method of claim 2 wherein the field value associated with the location field includes a plurality of data points corresponding to latitude, longitude, aged, speed, and direction.

6. The method of claim 2 wherein the field value associated with the identification field includes a telematics unit identification number.

7. The method of claim 2 wherein the field value corresponding to the location field is encrypted.

8. The method of claim 1 further comprising:
   receiving services at the telematics unit from the call center based on the subscriber status.

9. The method of claim 1 wherein sending the awareness message with the subscriber status from the telematics unit to a call center further comprises:
   receiving a request from a call center to send the awareness message; and
   sending the awareness message from the telematics unit to the call center responsive to the request.

10. The method of claim 1 wherein the subscriber status is a user parameter of a session initiation protocol SIP register request.

11. A method of providing telematics unit information to a call center, comprising the steps of:
    generating an awareness message at a telematics unit in accordance with a messaging protocol, the awareness message including a header and a payload;
    inserting data elements into the header including an identification element and a mode element, the identification element including an identification of the telematics unit, and the mode element including an operational status of the telematics unit; and
    sending the awareness message from the telematics unit to a call center.

12. The method of claim 11, further comprising the step of detecting a change in the state of the telematics unit.

13. The method of claim 11, further comprising the step of receiving a request from the call center to send the awareness message.

14. The method of claim 11, wherein the data elements included into the header in the inserting step further include a location element, inserting data elements into the header including a location element, the location element including the telematics units location.

15. The method of claim 11, wherein the messaging protocol is a session initiation protocol (SIP) and the awareness message is generated as a SIP request.

16. The method of claim 11, wherein each of the plurality of data elements includes a field identifier and a corresponding field value delimited by a field separator.

17. The method of claim 11 wherein the field value associated with the mode element identifies the operational status of the telematics unit and is selected from the group consisting of on, standby, sleep, in-session, out of session, and off.

18. The method of claim 11, wherein the field value associated with the location element includes a plurality of data points corresponding to latitude, longitude, aged, speed, and direction.

19. The method of claim 11, wherein the field value associated with the identification element includes a telematics unit identification number.

20. The method of claim 11, wherein the field value corresponding to the location element is encrypted.

21. A method of providing telematics unit information to a call center, comprising the steps of:
    generating an awareness message at a telematics unit in response to a change in the state of the telematics unit or a request by a call center to send the awareness message, the awareness message including a session initiation protocol (SIP) request containing a subscriber status located in the header of the SIP request, and wherein the subscriber status includes the operational status of the telematics unit;
    inserting a plurality of data elements into the subscriber status, wherein the plurality of data elements include an identification field, a mode field, and a location field, and each of the plurality of data elements includes a field identifier and a corresponding field value; and
    sending the awareness message with the SIP request from the telematics unit to a call center.

* * * * *